INVENTORS
WOLFGANG PLANERT
HORST STÜHMKE

June 6, 1961 W. PLANERT ET AL 2,986,981
CAMERA AND VARIABLE FOCAL LENGTH LENS
Filed Oct. 23, 1957 2 Sheets-Sheet 2
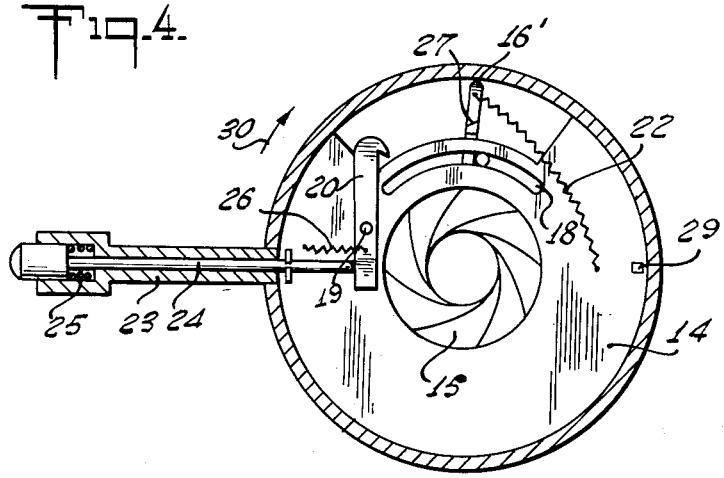
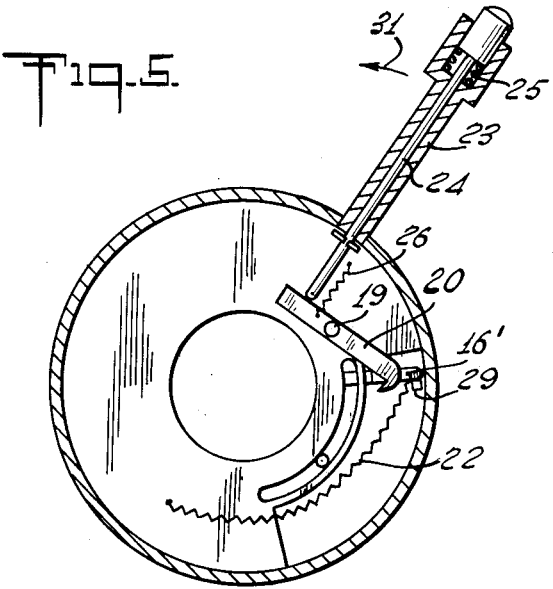
INVENTORS
WOLFGANG PLANERT
HORST STÜHMKE

United States Patent Office 2,986,981
Patented June 6, 1961

2,986,981
CAMERA AND VARIABLE FOCAL LENGTH LENS
Wolfgang Planert and Horst Stühmke, Dresden, Germany, assignors to VEB Kamera- und Kinowerke Dresden
Filed Oct. 23, 1957, Ser. No. 691,896
Claims priority, application Germany Jan. 5, 1957
4 Claims. (Cl. 95—45)

This invention relates to photographic apparatus and more particularly to a lens assembly for still and motion picture cameras.

It is customary in both the taking of still and motion picture photographs to use lenses of variable focal length. Insofar as the use of such lenses in connection with cameras of the type having a reflex finder is concerned, it is usually advisable to completely open the iris diaphragm in order to obtain as bright an image as possible upon the ground glass plate during the focusing operation. Furthermore, since the focusing can be more accurately effected through the use of a larger focal length setting than a smaller one, the optical lens system is advisably set to its maximum focal length before commencing the focusing operation. These various adjustments require a substantial number of manipulations by the operator, such that any one or more thereof can very easily be overlooked. Accordingly, an object of the present invention is to provide apparatus for use in connection with the focusing of still and motion picture cameras whereby the possibility of such errors is minimized.

Another object of the present invention is to provide apparatus of the above type in which the various adjustment members of the lens system are mechanically associated with each other so as to facilitate the entire focusing procedure.

Other objects of the invention are to provide a lens system bearing the above objects in mind which is of simple construction, has a minimum number of parts, is inexpensive to manufacture and efficient in operation.

In accordance with the present invention, a lens having a variable focal length is provided with a preselection spring diaphragm that is actuated by means of a release member which is displaceably supported within the handle of the focal length adjustment apparatus. One particularly advantageous embodiment of the present invention consists in the opening and cocking of the spring diaphragm by the handle which is also used to set the focal length adjustment so that the requirement for a separate diaphragm actuating lever is eliminated.

For other objects and for a better understanding of the invention, reference may be had to the following detailed description taken in conjunction with the accompanying drawing, in which:

FIG. 4 is a view similar to FIG. 2, showing a modified arrangement of the present invention; and FIG. 5 is a view similar to FIG. 4, showing an adjusted position of the associated parts.

Figures 1, 2, 3:
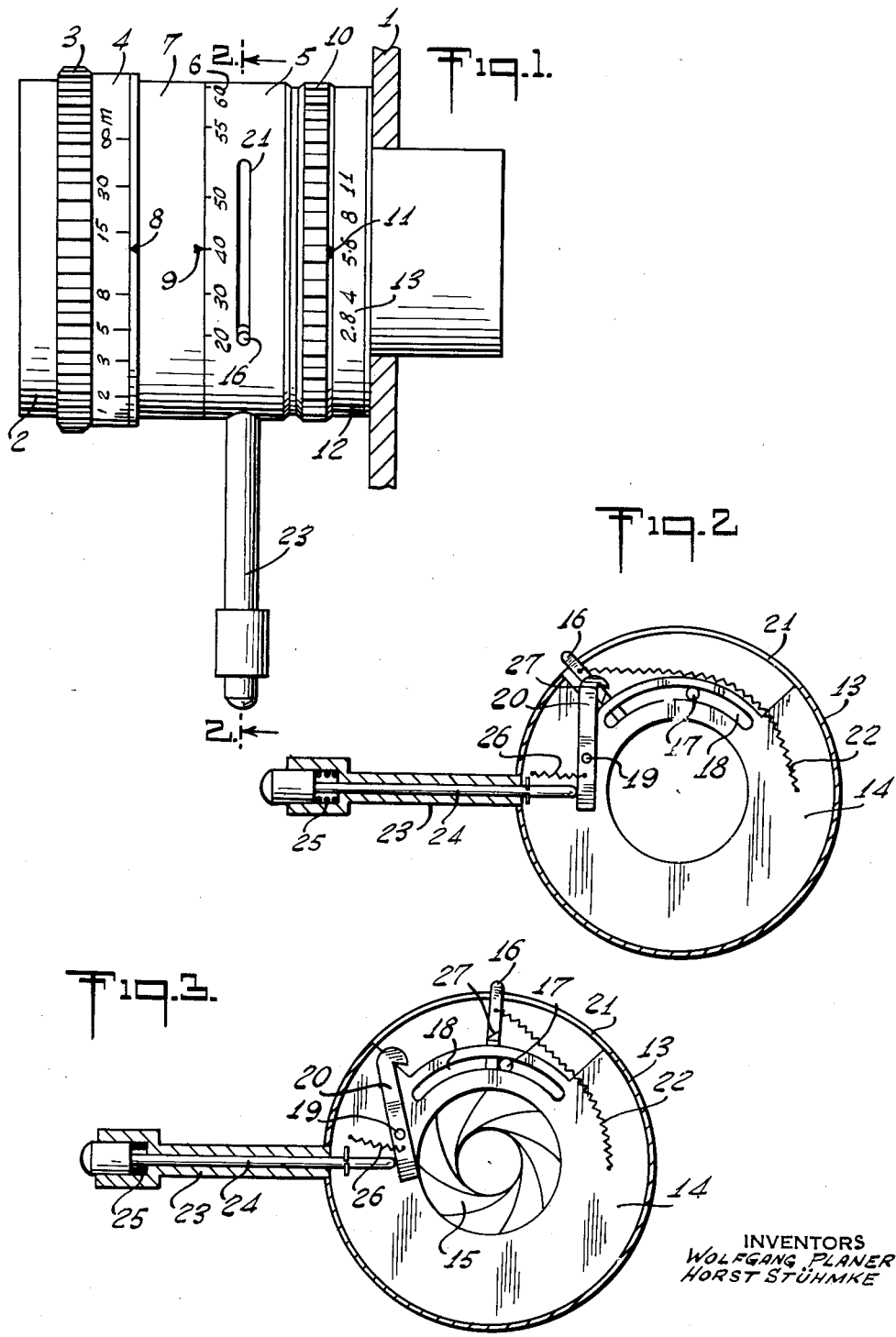
FIG. 1 is a top plan view of a variable focal length lens assembly made in accordance with the present invention.
FIG. 2 is a transverse cross sectional view taken along line 2—2 of FIG. 1, showing the parts in one predetermined position.
FIG. 3 is a view similar to FIG. 2, showing the parts in an adjusted position.

Referring now more in detail to FIGS. 1 to 3, of the drawing, a lens assembly 2 made in accordance with one form of the present invention, is shown in operative association with the front plate 1 of a reflex type camera (not shown). This assembly is shown to include a ring 3 that is provided with a distance scale 4 for focusing the lens system. In addition, a ring 5 having a focal length scale 6 is provided for setting the focal length of the system. A stationary ring 7 is disposed between the adjustable rings 3, 5 and has oppositely facing markings or indicia 8, 9 for determining the setting of the distance and focal length rings associated therewith. Another ring 10 having a setting or indicia 11 is provided for presetting a stop forming a part of the present invention, in a manner hereinafter described. Another ring 12 having a stop scale 13 is coupled for movement with the adjustable ring 5 relative to the ring 10.

As is more clearly shown in FIGS. 2 and 3, the stationary ring 5 is provided with a circular plate 14 on which the diaphragm blades 15 are supported for movement between an open and a closed position. The diaphragm actuating lever 16 is slidably supported upon the plate 14 for movement relative to an adjustable diaphragm stop member 17 disposed within the slot 18 within which the lever 16 is guided. A shift pawl 20 is pivotally supported upon the plate 14 by means of a pivot pin 19 and has a latch element at one end thereof for selective engagement with a lug 27 carried by the diaphragm lever 16. The lever 16 extends through a slot 21 defined by the ring 5 and is normally urged in a direction toward the stop 17 by means of a tension spring 22. The position of the stop 17 is determined by the setting of the ring 10 which has the pointer 11 for indicating the setting of the diaphragm.

A handle 23 is secured to the focal length setting ring 5 and is provided with a longitudinally displaceable pin 24. In the normal position, the release pin 24 is urged outwardly by a compression spring 25 disposed within the handle 23. A tension spring 26 normally urges the adjacent end of the shift pawl 20 against the end of the release pin 24, whereby the opposite end of the pawl is similarly biased into locking engagement with the lug 27 of the diaphragm lever 16.

In actual use, the proper stop or lens opening is determined in a conventional manner by measuring the intensity of the light and adjusting the ring 10. Thereupon, the diaphragm is opened completely by rotating the diaphragm lever 16 to its extreme position shown in FIG. 2. During this movement, the pawl 20 locks behind the lug 27 and retains the lever 16 in that position against the action of the spring 22, following which the maximum focal length is then set by means of the handle 23. Thus, with the maximum diaphragm opening and the maximum focal length setting, the exact focusing can be readily effected by rotating the ring 3. The handle 23 is then used to position the desired part of the picture, following which, the release pin 24 is pressed inwardly in the direction of the arrow 28 to release the diaphragm lever 16 so that the diaphragm can be closed down to the predetermined setting, as shown in FIG. 3, as determined by the position of the stop pin 17.

Referring now to FIGS. 4 and 5 of the drawing, a modified form of construction is shown wherein the separate actuation of the diaphragm lever 16 is eliminated. This is achieved by placing a stationary stop member 29 in the path of movement of the diaphragm lever 16, which stop may be supported upon the stationary ring 7. In operating this embodiment of the present invention, the lens opening is selected in the manner hereinbefore explained. Following the setting of the assembly, the handle 23 is rotated toward the direction of the minimum focal length setting, in the direction of the arrow 30 as shown in FIG 4. The handle 23 and the ring 5 can, however, be set not only to the minimum focal length value in this direction, but also up to a stop that permits movement of the handle 23 beyond the minimum value of the focal length. In response to the aforementioned rotation of the handle 23, the ring 5 together with all of the parts supported on the plate 14 and the rotatably mounted diaphragm lever 16 are rotated. The diaphragm lever 16, however, follows the motion only until it abuts against the stationary stop 29 and in response to further movement of the handle 23, the pawl 20 drops behind the lug 27 of the diaphragm lever. The diaphragm is thus opened and cocked, as shown in FIG. 5. Then, by rotating the handle 23 in the direction of the arrow 31, as shown in FIG. 5, the maximum focal length is set and the focusing is effected by means of the ring 3. Following this operation, the picture section is determined and the spring diaphragm is finally released in the manner hereinbefore described in connection with FIGS. 2 and 3. The diaphragm lever 16 cannot be displaced by the stop 29 during the determination of the picture section since it does not come into contact therewith within the setting range of the focal length because of the aforementioned stroke of the ring 5.

In order to facilitate the operation of the mechanism, the diaphragm release mechanism in both of the aforementioned embodiments may also be coupled to the release device for the feed mechanism, thereby eliminating an additional step. Of course, this invention is not limited to cameras in which the reflex finder is separately supported within the camera, but can also be used when the reflex finder is combined with the camera lens system.

While this invention has been described with particular reference to the construction shown in the drawing, it is to be understood that such is not to be construed as imparting limitations upon the invention, which is best defined by the claims appended hereto.

Having thus described my invention, we claim as new and desire to secure by Letters Patent:

1. An objective lens assembly for a camera comprising an objective lens of variable focal length and variable aperture, rotatable means positioned on said mount for varying the focal length of said lens, said rotatable means including a handle, diaphragm control means mounted for rotation with said rotatable means and movable with respect to said rotatable means for varying the aperture of said lens when moved with respect to said rotatable means, resilient means mounted at one end on said rotating means and on the other end on said diaphragm control means for urging movement of said diaphragm control means in the direction producing minimum aperture, an adjustable preselecting member mounted on said rotatable means and engageable with said aperture control means for arresting movement of said aperture control means at a predetermined position against the urging of said resilient means for producing a predetermined aperture, stationary blocking means positioned in the path travelled by said diaphragm control means when said diaphragm control means is rotated with said rotatable means so as to block said diaphragm control means and cause movement thereof with respect to said rotatable means against the urging of said resilient means and toward a position producing maximum aperture, catch means on said rotatable means for arresting said aperture control means in the position producing maximum aperture, whereby said rotatable means can then be moved to any focal length at maximum aperture so as to provide viewing at maximum aperture, and release means mounted on said handle and engageable with said catch means for releasing said aperture control means from said catch means, whereby at any focal length said resilient means may urge said aperture control means against said preselecting means so as to provide a predetermined aperture.

2. In a lens assembly of variable focal length and an adjustable iris having a mount, a circular plate coaxial with said mount and capable of varying the focal length by rotation thereof, an arm radially projecting from said plate for movement thereof, a preselector pin adjustably mounted on said plate for determining the desired aperture, a lever on said plate mounted for movement with respect to said plate and connected with the iris to adjust the aperture thereof, a spring connected to said plate and said lever for biasing said lever toward said pin so as to obtain the desired lens aperture thereby, a stationary blocking arm on said mount positioned in the path of said lever when said plate is rotated and capable of moving said lever toward a position of maximum aperture so as to stretch said spring when said plate is turned, a protrusion on said lever, a pivotally mounted pawl on said plate biased in one direction and positioned to catch said protrusion and hold said lever in the position of maximum aperture, a release pin coaxially mounted in said radially extending arm having a head protruding from said arm, said pin being outwardly biased and in engagement with said pawl, whereby when said pin is pressed said pawl releases said protrusion and allows closing of the iris to the predetermined position.

3. In an objective lens assembly of variable focal length and variable aperture having an objective mount, rotatable means on said objective mount for adjusting the focal length of said objective, said rotatable means including an arm projecting from said mount and a plate mounted transverse to the axis of said mount, diaphragm control means supported on said rotatable means for controlling the aperture of said objective, resilient means on said rotatable means for biasing said diaphragm control means to a preselected aperture, arresting means on said rotatable means for arresting and retaining said diaphragm control means in an energized condition and at maximum objective aperture, said arresting means including a biased pawl mounted on said plate, means for releasing said diaphragm control means slidably disposed on said arm of said rotatable means, said releasing means including a pin mounted in said arm for engagement by said pawl of the arresting means, and stationary means secured to said mount operative to open and cock said diaphragm control means by actuation of said rotatable means.

4. In a lens assembly as set forth in claim 3, said diaphragm control means including a spring biased lever slidably disposed with regard to said rotatable means.

References Cited in the file of this patent

UNITED STATES PATENTS

| | | |
|---|---|---|
| 1,950,166 | Durholz | Mar. 6, 1934 |
| 2,566,889 | Hopkins | Sept. 4, 1951 |
| 2,612,093 | Schutz | Sept. 30, 1952 |
| 2,777,371 | Schutz | Jan. 15, 1957 |